(12) United States Patent
Shimizu

(10) Patent No.: US 10,572,092 B2
(45) Date of Patent: Feb. 25, 2020

(54) METHOD FOR ACQUIRING DATA FROM RESISTIVE FILM TOUCH PANEL AND RESISTIVE FILM TOUCH PANEL DEVICE

(71) Applicant: NISSHA CO., LTD., Kyoto-shi, Kyoto (JP)

(72) Inventor: Kenichi Shimizu, Kyoto (JP)

(73) Assignee: NISSHA CO., LTD., Kyoto (JP)

( * ) Notice: Subject to any disclaimer, the term of this patent is extended or adjusted under 35 U.S.C. 154(b) by 0 days.

(21) Appl. No.: 16/313,930

(22) PCT Filed: Aug. 17, 2017

(86) PCT No.: PCT/JP2017/029524
§ 371 (c)(1),
(2) Date: Dec. 28, 2018

(87) PCT Pub. No.: WO2018/043148
PCT Pub. Date: Mar. 8, 2018

(65) Prior Publication Data
US 2019/0227657 A1    Jul. 25, 2019

(30) Foreign Application Priority Data

Sep. 2, 2016 (JP) .................................. 2016-171344

(51) Int. Cl.
*G06F 3/045*    (2006.01)
*G06F 3/041*    (2006.01)

(52) U.S. Cl.
CPC ............ *G06F 3/045* (2013.01); *G06F 3/0416* (2013.01)

(58) Field of Classification Search
CPC .................. G06F 3/045; G06F 3/0416; G06F 2203/04104
See application file for complete search history.

(56) References Cited

U.S. PATENT DOCUMENTS 9,660,646 B1 *  5/2017  Sauer ................. H03K 17/9622
2011/0310025 A1 * 12/2011  Simmons .............. G06F 3/0416
                                                        345/173
(Continued)

FOREIGN PATENT DOCUMENTS

JP        H03-63720 A      3/1991
JP      2009-282825 A     12/2009
(Continued)

OTHER PUBLICATIONS

English language translation of International Search Report for PCT/JP2017/029524, dated Sep. 26, 2017.
(Continued)

*Primary Examiner* — Abhishek Sarma
(74) *Attorney, Agent, or Firm* — Xsensus LLP

(57) ABSTRACT

A method for acquiring data from a resistive film touch panel includes: A step in which, in a first drive mode in which a first drive circuit sequentially drives a first drive electrode group of the plurality of drive electrodes, a first detection circuit detects a first detection electrode group of the plurality of detection electrodes, and a second detection circuit detects a second detection electrode group of the plurality of detection electrodes. A step in which, in a second drive mode in which a second drive circuit sequentially drives a second drive electrode group of the plurality of drive electrodes, the first detection circuit detects the first detection electrode group, and the second detection circuit detects the second detection electrode group.

8 Claims, 8 Drawing Sheets

(56) References Cited

U.S. PATENT DOCUMENTS

2012/0056662 A1    3/2012  Wilson et al.
2012/0056822 A1*  3/2012  Wilson .................. G06F 3/0416
                                                           345/173

FOREIGN PATENT DOCUMENTS

JP       2013-045209 A    3/2013
WO     2015/166898 A1   11/2015

OTHER PUBLICATIONS

Supplementary European Search Report completed May 7, 2019 in European Application No. 17846156.

* cited by examiner

METHOD FOR ACQUIRING DATA FROM RESISTIVE FILM TOUCH PANEL AND RESISTIVE FILM TOUCH PANEL DEVICE

TECHNICAL FIELD

The present invention relates to a method for acquiring data from a resistive film touch panel, and a resistive film touch panel device.

BACKGROUND ART

Resistive film touch panel devices include analog types and digital types (matrix type). In digital resistive film touch panel devices, vertically disposed drive electrodes and detection electrodes are aligned in directions intersecting each other to form a grid pattern. As a basic operation, a drive signal is sequentially applied to the drive electrodes, and whether a detection signal appears for each detection electrode is detected. In a case that a drive electrode and a detection electrode that face each other are brought into contact with each other by being pressed down by a finger or a pen, the contact position is detected as the intersection point of the grid, and in this way the pressing point is identified (see Patent Document 1, for example).

CITATION LIST

Patent Literature

Patent Document 1: JP 2009-282825 A

SUMMARY OF INVENTION

Technical Problem

Generally, in a case that large-sized and high-resolution resistive film touch panel devices are manufactured, the number of drive electrodes and detection electrodes increases. However, there is a limit to the number of electrodes that can be controlled by one touch controller.

Accordingly, in a case that the above touch panel devices are manufactured, the following problems arise.

First, the number of touch controllers increases, therefore increasing the cost.

Second, it is difficult to manufacture the vicinity of the boundary between the sensor regions controlled by each touch controller on the touch panel. Particularly, in a case of manufacturing electrodes by screen printing, the end portions of the electrodes on both sides are arranged in the vicinity of the boundary. Since the end portions of the electrode form the peak of the printed film thickness, the sensitivity of the boundary portion is increased. That is, in-plane sensitivity variations occur in the touch panel.

An object of the present invention is to minimize the number of touch controllers of resistive film touch panel devices to improve the uniformity of in-plane sensitivity.

Solution to Problem

Some aspects are described below as the means to solve the problems. These aspects can be combined optionally as needed.

A method for acquiring data from a resistive film touch panel according to one aspect of the present invention is a method for acquiring data from a resistive film touch panel including a plurality of drive electrodes that extend in a first direction and a plurality of detection electrodes that extend in a second direction intersecting the first direction and that face the plurality of drive electrodes. This method includes the following steps.

A step in which, in a first drive mode in which a first drive circuit sequentially drives a first drive electrode group of the plurality of drive electrodes, a first detection circuit detects, among the plurality of detection electrodes, a first detection electrode group that intersects the first drive electrode group, and a second detection circuit detects, among the plurality of detection electrodes, a second detection electrode group that intersects the first drive electrode group.

A step in which, in a second drive mode in which a second drive circuit sequentially drives, among the plurality of drive electrodes, a second drive electrode group that intersects the first detection electrode group and the second detection electrode group, the first detection circuit detects the first detection electrode group, and the second detection circuit detects the second detection electrode group.

In this method, when the first drive circuit drives one of the first drive electrode groups, the first detection circuit detects the first detection electrode group, and the second detection circuit detects the second detection electrode group. Accordingly, in a case where the intersection of these drive electrodes is pressed, the pressing point is ascertained as a result of a signal detected from the first detection electrode and/or the second detection electrode. In addition, when the second drive circuit drives one of the second drive electrode groups, the first detection circuit detects the first detection electrode group and the second detection circuit detects the second detection electrode group. Accordingly, in a case where the intersection of these drive electrodes is pressed, the pressing point is ascertained as a result of a signal detected from the first detection electrode and/or the second detection electrode.

In this method, the first detection circuit detects the pressing point in a case that the first drive electrode group is driven by the first drive circuit or in a case that the second drive electrode group is driven by the second drive circuit. The second detection circuit detects the pressing point in a case that the first drive electrode group is driven by the first drive circuit or in a case that the second drive electrode group is driven by the second drive circuit. According to the above, the number of sensor regions covered by the drive circuit and the detection circuit can be increased. For example, four sensor regions which would require four sets of drive circuits and detection circuits in the related art can be covered with two sets of drive circuits and detection circuits according to the present invention.

A sensor region is divided into four in the related art, while a single sensor region is used in the present invention. This prevents the end portions of the electrodes from being arranged inside the sensor regions in the present invention (that is, there is no boundary portion between the electrodes). As a result, the sensitivity uniformity in the plane of the touch panel is improved.

A resistive film touch panel device according to another aspect of the present invention includes a resistive film touch panel, a first touch controller, and a second touch controller.

The resistive film touch panel includes a plurality of drive electrodes that extend in a first direction and a plurality of detection electrodes that extend in a second direction intersecting the first direction and that face, with a spacing, the plurality of drive electrodes.

The first touch controller includes a first drive circuit configured to electrically connect to a first drive electrode group of the plurality of drive electrodes and a first detection circuit configured to electrically connect to, among the plurality of detection electrodes, a first detection electrode group that intersects the first drive electrode group. It should be noted that "configured to electrically connect" as used herein refers to actual transmission and reception of electrical signals.

The second touch controller includes a second drive circuit configured to electrically connect to, among the plurality of drive electrodes, a second drive electrode group that intersects the first detection electrode group and a second detection circuit configured to electrically connect to, among the plurality of detection electrodes, a second detection electrode group that intersects the first drive electrode group and the second drive electrode group. It should be noted that "configured to electrically connect" as used herein refers to actual transmission and reception of electrical signals.

In this device, the number of sensor regions covered by a touch controller can be increased; that is, the number of touch controllers can be reduced. In particular, the first touch controller and the second touch controller can cover an area corresponding to four sensor regions, which would require four touch controllers in the related art.

A sensor region is divided into four in the related art, while a single sensor region is used in the present invention. This prevents the end portions of the electrodes from existing inside the sensor regions in the present invention (that is, there is no boundary portion between the electrodes). As a result, the sensitivity uniformity in the plane of the touch panel is improved.

In a first drive mode in which the first drive circuit sequentially drives the first drive electrode group, the first detection circuit may detect the first detection electrode group and the second detection circuit may detect the second detection electrode group.

In a second drive mode in which the second drive circuit sequentially drives the second drive electrode group, the first detection circuit may detect the first detection electrode group, and the second detection circuit may detect the second detection electrode group.

In this device, the first detection circuit detects the pressing point in a case that the first drive electrode group is driven by the first drive circuit or in a case that the second drive electrode group is driven by the second drive circuit. The second detection circuit detects the pressing point both in a case that the first drive electrode group is driven by the first drive circuit or in a case that the second drive electrode group is driven by the second drive circuit.

In the first drive mode, the first touch controller and the second touch controller may synchronize with each other such that an operation for detecting the first detection electrode group by the first detection circuit and an operation for detecting the second detection electrode group by the second detection circuit are performed simultaneously.

In the second drive mode, the first touch controller and the second touch controller may synchronize with each other such that an operation for detecting the first detection electrode group by the first detection circuit and an operation for detecting the second detection electrode group by the second detection circuit are performed simultaneously.

In this device, since the operation for detecting the first detection electrode group by the first detection circuit and the operation for detecting the second detection electrode group by the second detection circuit are simultaneously performed, the detection time can be shortened as a result.

Advantageous Effects of Invention

In the method for acquiring data from the resistive film touch panel and the resistive film touch panel device according to the present invention, the number of touch controllers is reduced as much as possible, and the uniformity of in-plane sensitivity is increased.

DESCRIPTION OF EMBODIMENTS

1. First Embodiment (1) Schematic Configuration of Touch Panel Device

Figure 1:
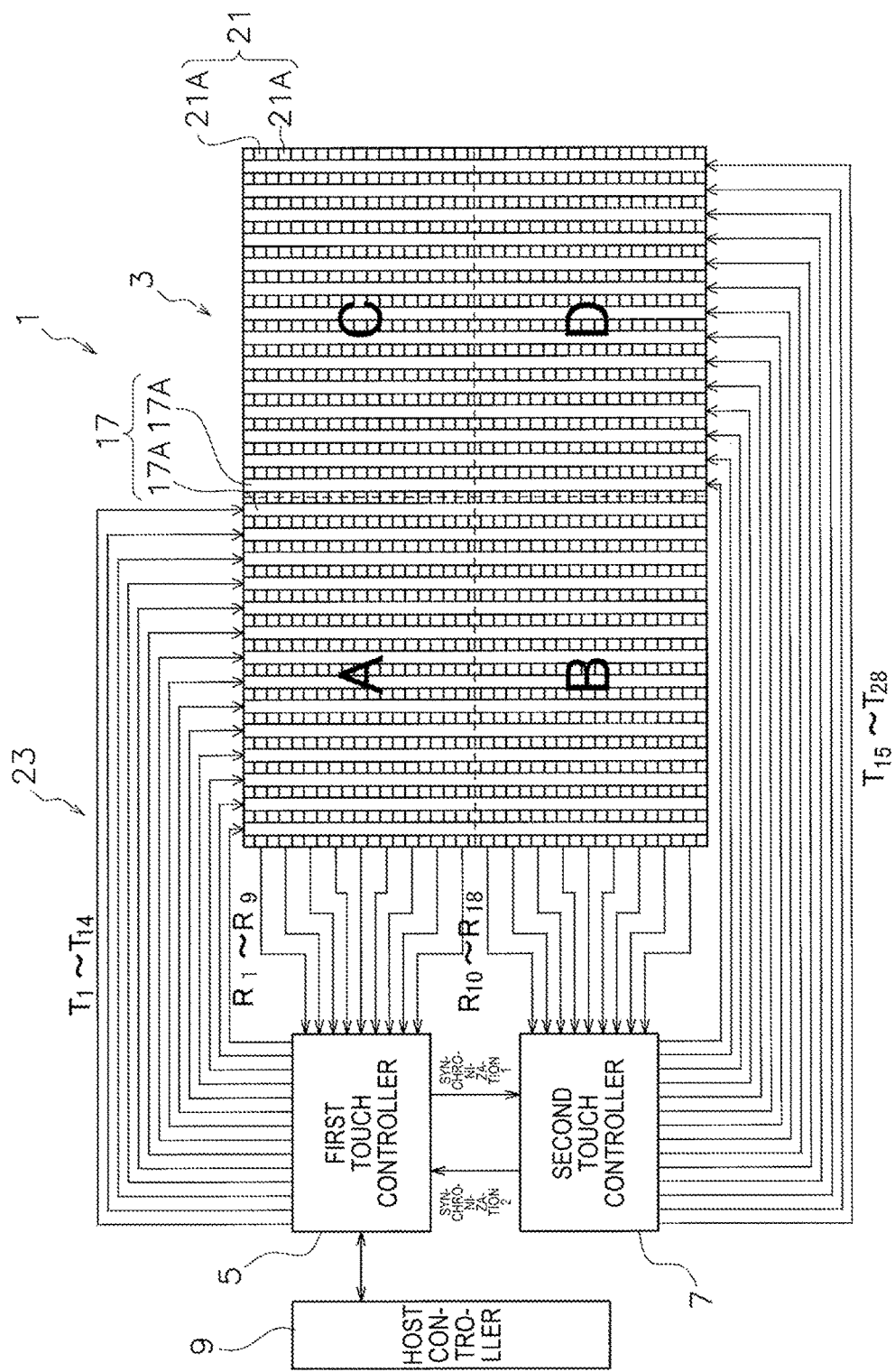
FIG. 1 is a schematic configuration diagram of a resistive film touch panel device according to a first embodiment of the present invention.

A resistive film touch panel device 1 (hereinafter, "touch panel device 1") according to a first embodiment of the present invention will be described with reference to FIG. 1. FIG. 1 is a schematic configuration diagram of a resistive film touch panel device according to the first embodiment of the present invention. The touch panel device 1 is utilized, for example, in a smartphone, a tablet PC, or a notebook PC.

The touch panel device 1 includes a matrix type (digital type) resistive film touch panel 3 (hereinafter referred to as "touch panel 3"). As will be described later, the touch panel 3 is divided into 504 matrix regions in which an upper electrode group 17 including 28 electrodes and a lower electrode group 21 including 18 electrodes overlap.

It should be noted that the upper electrode group and the lower electrode group may not necessarily be orthogonal to each other, and they may intersect at any angle. In addition, the number of upper electrode groups, lower electrode groups, and matrix regions is not limited.

The touch panel device 1 includes a first touch controller 5 and a second touch controller 7.

As will be described later, the first touch controller 5 and the second touch controller 7 include a function for detecting a pressed location by applying a voltage to the electrodes and detecting a change.

The touch panel device 1 includes a host controller 9. The host controller 9 is configured to control the entire system, and include a function for executing processing based on the touch coordinate location obtained by the first touch controller 5 and the second touch controller 7.

The host controller 9 is a computer system including a processor (e.g. a CPU), a storage device (e.g. a ROM, a RAM, an HDD, an SSD, or the like), and various interfaces (e.g. an A/D converter, a D/A converter, a communication interface, or the like).

(2) Touch Panel

Figure 2:
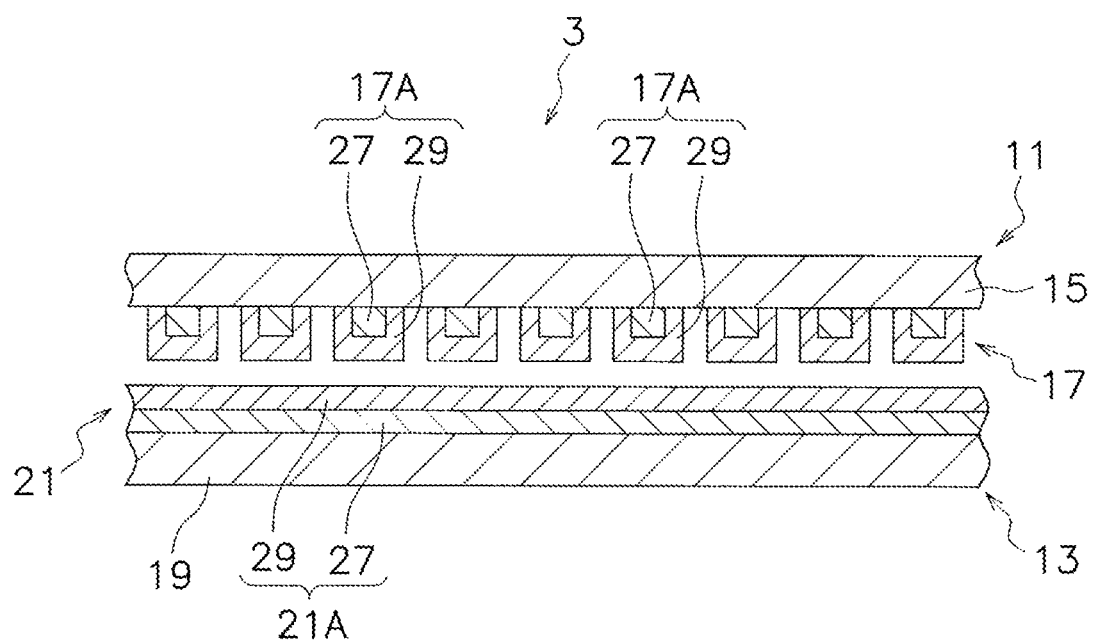
FIG. 2 is a partial cross-sectional view of a touch panel.

The structure of the touch panel 3 will be described with reference to FIG. 2. FIG. 2 is a partial cross-sectional view of a touch panel.

The touch panel 3 primarily includes an upper electrode member 11 and a lower electrode member 13. The upper electrode member 11 includes, for example, a rectangular insulating film 15 and an upper electrode group 17 formed on the lower surface thereof. The lower electrode member 13 includes, for example, a rectangular insulating film 19 and a lower electrode group 21 formed on the upper surface thereof. The upper electrode member 11 and the lower electrode member 13 are adhered to each other at a peripheral edge portion. The insulating film 15 and the insulating film 19 may be transparent or opaque.

The upper electrode group 17 and the lower electrode group 21 are formed of a plurality of strip-shaped patterns formed on the insulating film 15 and the insulating film 19, respectively. The upper electrode group 17 includes a plurality of drive electrodes 17A (an example of the drive electrodes), each of which extends long in the vertical direction (an example of the first direction) of FIG. 1. The lower electrode group 21 includes a plurality of detection electrodes 21A (an example of the detection electrodes), each of which extends long in the left-right direction (an example of the second direction) of FIG. 1.

The upper electrode group 17 and the lower electrode group 21 face each other in the vertical direction. A spacing is secured between the upper electrode group 17 and the lower electrode group 21. In a case that a region of the drive electrode is pressed down toward the detection electrode, the drive electrode 17A located in the pressed region and the detection electrode 21A electrically conduct. The pressing may be performed with a finger, a stylus pen, a rod, or the like.

It should be noted that in the description of the driving operation, the drive electrode 17A is represented by Tx (where x is a positive integer) in order to clarify the difference between them. In addition, in the description of the detection operation, the detection electrode 21A is represented by Rx (where x is a positive integer) in order to clarify the difference between them.

It should be noted that, as illustrated in FIG. 1, the touch panel 3 is connected to the first touch controller 5 and the second touch controller 7 by the wiring 23. Although not explicitly indicated, the wiring 23 includes a routing line from the upper electrode group 17 and the lower electrode group 21 to the input/output terminals of the touch panel 3. Typically, the routing line is formed by a printing method such as screen printing, offset printing, gravure printing, or flexographic printing, or a brush coating method, using a conductive paste of a metal such as gold, silver, copper, and nickel, or carbon.

Engineering plastics such as a polycarbonate type, a polyamide type, or a polyether ketone type, or resin films such as an acrylic type, a polyethylene terephthalate type, a polybutylene terephthalate type or the like can be used as the insulating film 15.

It should be noted that a hard coat layer can be formed on the upper surface of the insulating film 15. Inorganic materials such as siloxane resin, or alternatively, organic materials such as an acrylic-epoxy type or a urethane type thermosetting resin, or an acrylate type photo-curable resin may be used as the hard coat layer.

In addition, the top surface of the insulating film 15 can be subjected to a non-glare treatment in order to prevent light reflection. For example, it is preferable to perform embossment processing, or to mix extender pigments or fine particles of silica, alumina or the like into the hard coat layer.

Furthermore, instead of a single film, the insulating film 15 may be a laminate in which a plurality of films are laminated.

Similar to the insulating film 15, engineering plastics such as a polycarbonate type, a polyamide type, or a polyether ketone type, or films of an acrylic type, a polyethylene terephthalate type, a polybutylene terephthalate type or the like can be used as the insulating film 19. Instead of a single film, the insulating film 19 may be a laminate in which a plurality of films are laminated.

A spacer (not depicted) is present between the upper electrode member 11 and the lower electrode member 13. In addition to the same resin film as the insulating base material, a printed layer or a coated layer of an appropriate resin such as an acrylic resin, an epoxy resin, and a silicone resin can be used as the spacer. In many cases, the spacer commonly serves as an adhesive layer, formed from double-sided tape, an adhesive, or a sealant in a frame shape, that fixes the upper electrode member 11 and the lower electrode member 13. In the case of forming an adhesive layer composed of an adhesive or a pressure-sensitive adhesive, screen printing or the like is utilized.

It should be noted that in a case of a relatively large-sized sensor, the spacer may be disposed above the drive electrode 17A or the detection electrode 21A. In this case, the spacer may be a plurality of small, dome-shaped spacers, for example.

(3) Upper Electrode Group and Lower Electrode Group

As illustrated in FIG. 2, the detection electrode 21A includes a conductive layer 27 and a pressure-sensitive ink layer 29 on the insulating film 15. It should be noted that a carbon layer may be provided on the conductive layer 27. By means of the carbon layer, the conductive layer 27 is protected from deterioration such as sulfurization, and the surface is further smoothed.

The insulating film 15 has a thickness of 125 µm, for example, and is preferably in a range from 25 µm to 200 µm. The conductive layer 27 has a thickness of 4 µm, for example, and is preferably in a range from 3 µm to 10 µm. The pressure-sensitive ink layer 29 has a thickness of 20 µm, for example, and is preferably in a range from 5 µm to 30 µm.

The conductive layer 27 can be composed of a metal oxide film such as tin oxide, indium oxide, antimony oxide, zinc oxide, cadmium oxide, or indium tin oxide (ITO), a composite film primarily composed of these metal oxides, or a metal film of gold, silver, copper, tin, nickel, aluminum, palladium, or the like. In addition, the conductive layer 27 may be composed of a material in which a conductive material such as carbon nanotubes, metal particles, metal nanofibers or the like are dispersed in a binder.

The composition that forms the pressure-sensitive ink layer 29 is composed of a material in which the electrical characteristics, such as the electric resistance value, change in accordance with external forces. The pressure-sensitive ink layer 29 can be disposed by coating. A printing method such as screen printing, offset printing, gravure printing, or flexographic printing can be used as a method for coating the pressure-sensitive ink layer 29.

It should be noted that since the drive electrodes 17A are the same as the detection electrodes 21A, the description thereof will be omitted.

(4) Touch Controller

Figure 3:
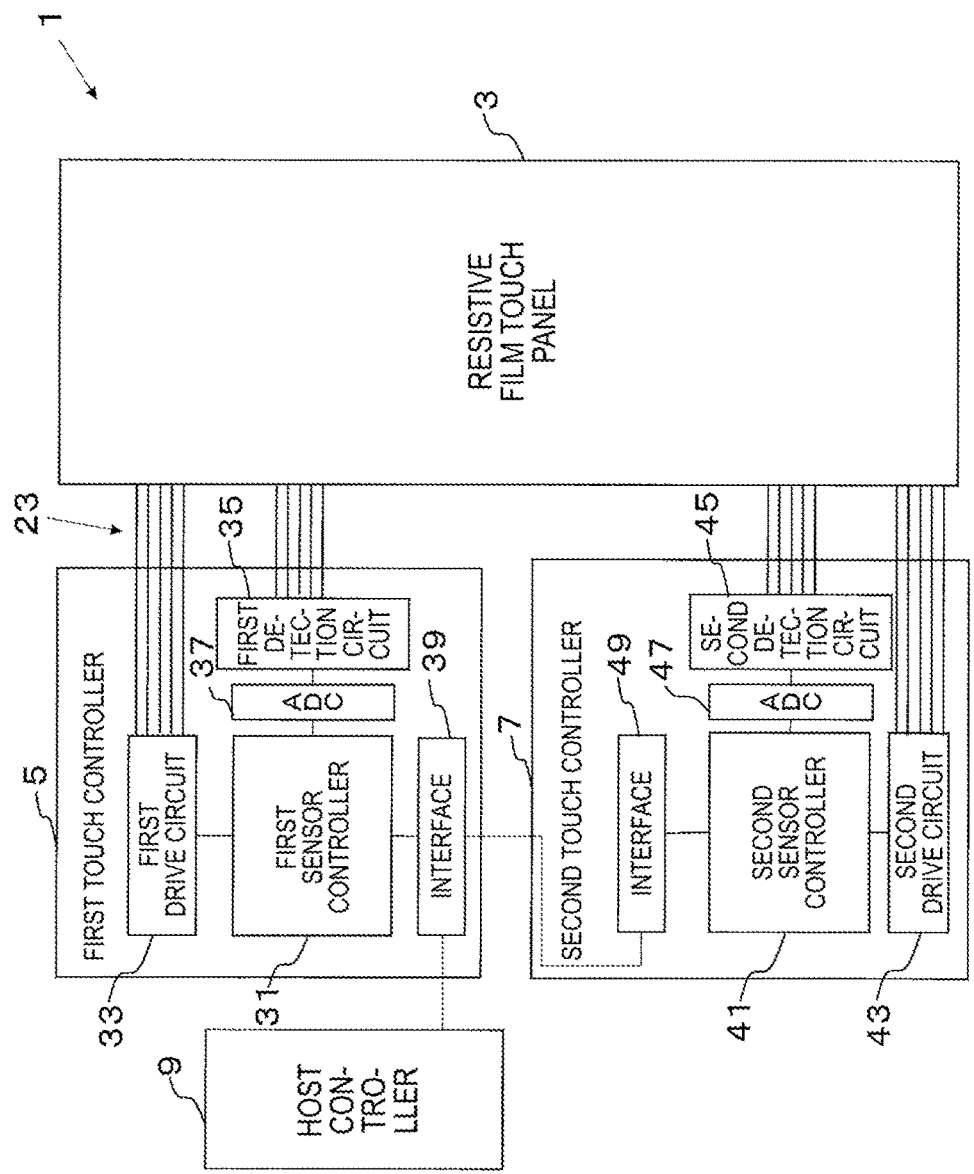
FIG. 3 is a block diagram of the internal configuration of a first touch controller and a second touch controller.

The configuration of the touch controller will be described with reference to FIG. 3. FIG. 3 is a block diagram of the internal configuration of a first touch controller and a second touch controller.

The first touch controller 5 has a function for acquiring position information. Hereinafter, the configuration of the first touch controller 5 will be specifically described.

The first touch controller 5 includes a first sensor controller 31. The first sensor controller 31 includes a function for controlling a device that will be described later.

The first sensor controller 31 is a computer system including a processor (e.g. a CPU), a storage device (e.g. a ROM, a RAM, an HDD, an SSD, or the like), and various interfaces (e.g. an A/D converter, a D/A converter, a communication interface, or the like). The first sensor controller 31 performs various control operations by executing programs stored in a storage unit (corresponding to part or all of the storage area of the storage device).

The first sensor controller 31 may be constituted by a single processor, but it may also be constituted by a plurality of independent processors for different operations.

Some or all of the functions of the respective elements of the first sensor controller 31 may be implemented by a program executable in the computer system that constitutes the control unit. In addition, some or all of the functions of the respective elements of the control unit may be configured by a custom IC.

Figure 4:
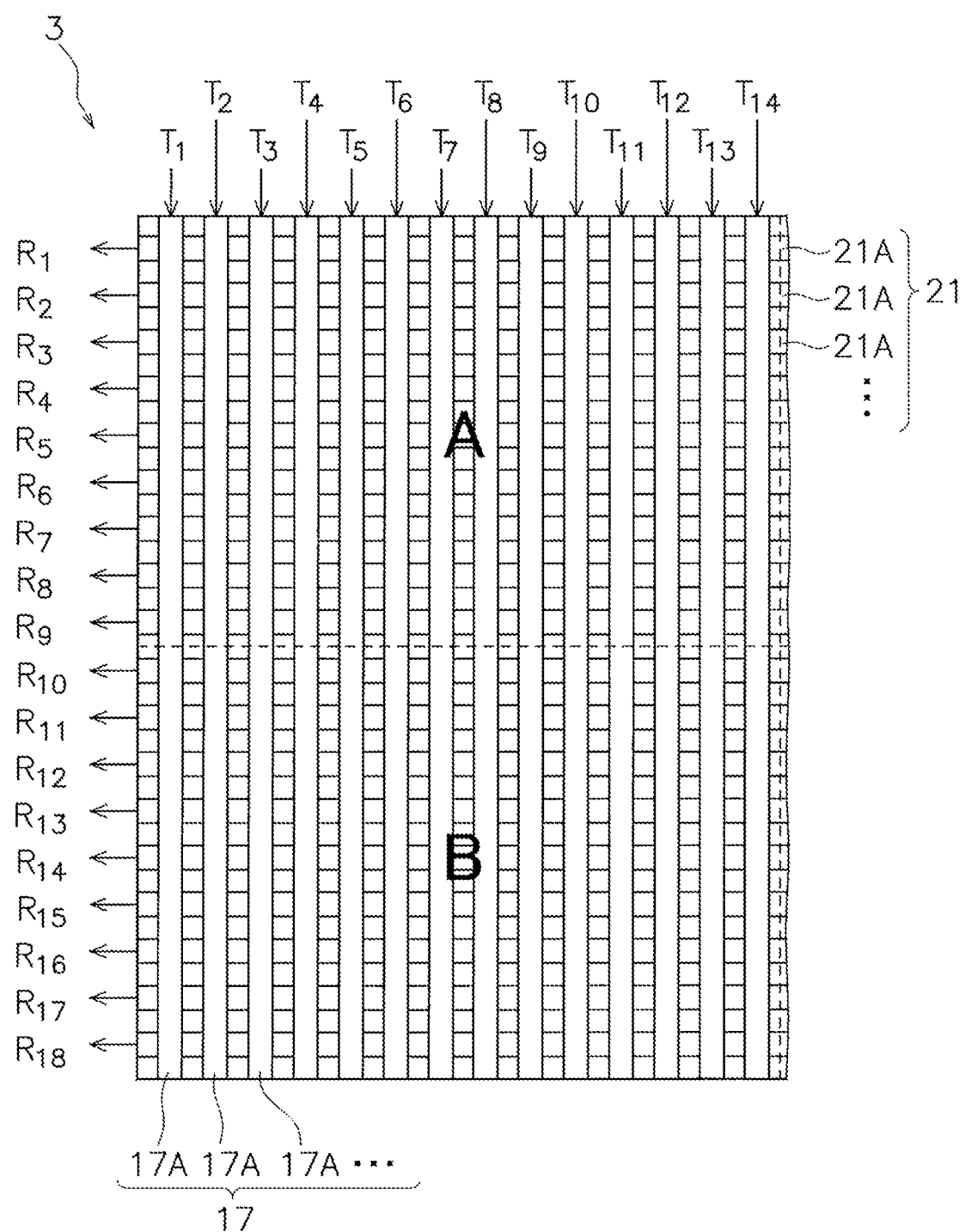
FIG. 4 is a partial plan view of the touch panel.

The first touch controller 5 includes a first drive circuit 33 (an example of the first drive circuit). The first drive circuit 33 transmits a drive signal to only a portion (in particular, half) of the drive electrodes 17A. As illustrated in FIG. 1 and FIG. 4, the drive signals are transmitted to the drive electrodes $T_1$ to $T_{14}$ (an example of the first drive electrode group). The drive electrodes $T_1$ to $T_{14}$ intersect the detection electrodes $R_1$ to $R_9$ and the detection electrodes $R_{10}$ to $R_{18}$.

The first touch controller 5 includes a first detection circuit 35 (an example of the first detection circuit). The first detection circuit 35 receives detection signals from only a portion (in particular, half) of the detection electrodes 21A. As illustrated in FIG. 1 and FIG. 4, the detection signals are received by the detection electrodes $R_1$ to $R_9$ (an example of the first detection electrode group). The detection electrodes $R_1$ to $R_9$ intersect the drive electrodes $T_1$ to $T_{14}$ and the drive electrodes $T_{15}$ to $T_{28}$.

The first touch controller 5 includes an analog/digital converter (ADC) 37. The ADC 37 converts the detection signals from the first detection circuit 35 into digital signals and transmits the signals to the first sensor controller 31.

The first touch controller 5 includes an interface 39. The first sensor controller 31 transmits and receives signals to and from the second touch controller 7 and the host controller 9 via the interface 39.

In particular, as illustrated in FIG. 1, the first touch controller 5 transmits and receives synchronization signals to and from the second touch controller 7.

The second touch controller 7 has a function for acquiring location information. Hereinafter, the configuration of the second touch controller 7 will be described in detail.

The second touch controller 7 includes a sensor controller 41. The sensor controller 41 has a function for controlling devices that will be described later. The configuration of the second sensor controller 41 is the same as that of the first sensor controller 31.

The second touch controller 7 includes a second drive circuit 43 (an example of the second drive circuit). The second drive circuit 43 transmits a drive signal to only a portion (in particular, half) of the drive electrodes 17A. More particularly, the second drive circuit 43 is connected to the drive electrodes 17A that are not connected to the first drive circuit 33. As illustrated in FIG. 1, the drive signals are transmitted to the drive electrodes $T_{15}$ to $T_{28}$ (an example of the second drive electrode group). The drive electrodes $T_{15}$ to $T_{28}$ intersect the detection electrodes $R_1$ to $R_9$ and the detection electrodes $R_{10}$ to $R_{18}$.

The second touch controller 7 includes a second detection circuit 45 (an example of the second detection circuit). The second detection circuit 45 receives detection signals from only a portion (in particular, half) of the detection electrodes 21A. As illustrated in FIG. 1 and FIG. 4, the detection signals are received by the detection electrodes $R_{10}$ to $R_{18}$ (an example of the second detection electrode group). Put differently, the second detection circuit 45 is connected to the detection electrodes 21A that are not connected to the first detection circuit 35. The detection electrodes $R_{10}$ to $R_{18}$ intersect the drive electrodes $T_1$ to $T_{14}$ and the drive electrodes $T_{15}$ to $T_{28}$.

The second touch controller 7 includes an analog/digital converter (ADC) 47. The ADC 47 converts the detection signals from the second detection circuit 45 into digital signals and transmits the signals to the sensor controller 41.

The second touch controller 7 includes an interface 49. The sensor controller 41 transmits and receives signals to and from the first touch controller 5 via the interface 49.

In particular, as illustrated in FIG. 1, the second touch controller 7 transmits and receives synchronization signals to and from the first touch controller 5.

The operations of the first touch controller 5 and the second touch controller 7 for each sensor region will be described.

In FIG. 1, the touch panel 3 is divided into four sensor regions, as indicated by the dashed lines. For the first sensor region A (if the divided regions are described in terms of a matrix, the first column from the left and the first row from the top) of the touch panel 3, the first touch controller 5 performs the drive and detection. For the second sensor region B (the first column from the left and the second row from the top), the first touch controller 5 performs the drive, and the second touch controller 7 performs the detection. For the third sensor region C (the second column from the left and the first row from the top), the second touch controller 7 performs the drive, and the first touch controller 5 performs the detection. For the fourth sensor region D (the second column from the left and the second row from the top), the second touch controller 7 performs the drive and detection.

The coordinate detection principle in a case that a force acts on the touch panel 3 will be described.

In the touch panel 3, in the case that a force acts on the upper surface of the insulating film 15, the area of the upper electrode member 11 is pressed down toward the lower electrode member 13. That is, the upper electrode group 17 is bent, and the drive electrode 17A located in the pressed area contacts the detection electrode 21A. As a result, a current flows between the pressure-sensitive particles in the pressure-sensitive ink layers 29, which causes the drive electrode 17A and the detection electrode 21A to be electrically conductive. As a result, it is possible to detect the position coordinates (XY position coordinates) at which the force has acted, and the force magnitude (Z coordinate).

It should be noted that the pressing may be performed with a finger, a stylus pen, a rod, or the like.

In the touch panel device 1, the number of sensor regions covered by a touch controller can be increased; that is, the number of touch controllers can be reduced. In particular, the first touch controller 5 and the second touch controller 7 can cover an area corresponding to four sensor regions, which would require four touch controllers in the related art.

A sensor region is divided into four in the related art for example, while a single sensor region is used in the present embodiment. This prevents the end portions of the electrodes from existing inside the sensor regions in the present embodiment (that is, there is no boundary portion between the electrodes). As a result, the sensitivity uniformity in the plane of the touch panel 3 is improved.

(5) Touch Panel Pressing Point Detection Control

Figure 5:
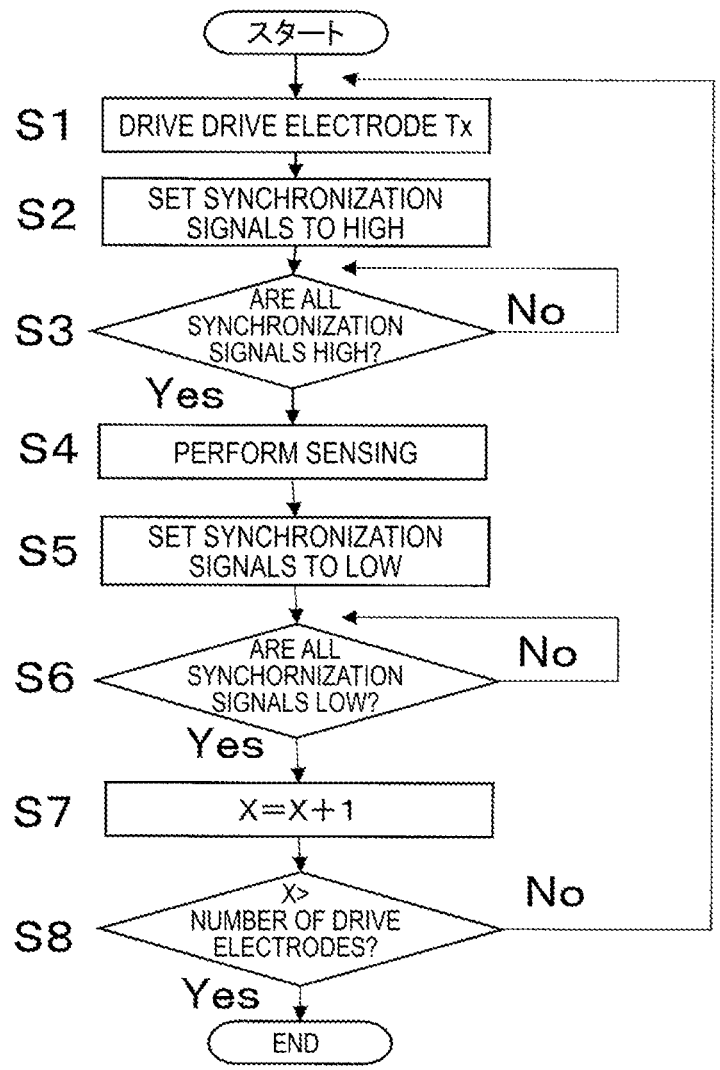
FIG. 5 illustrates a flowchart for a touch panel pressing point detection control.
Figure 6:
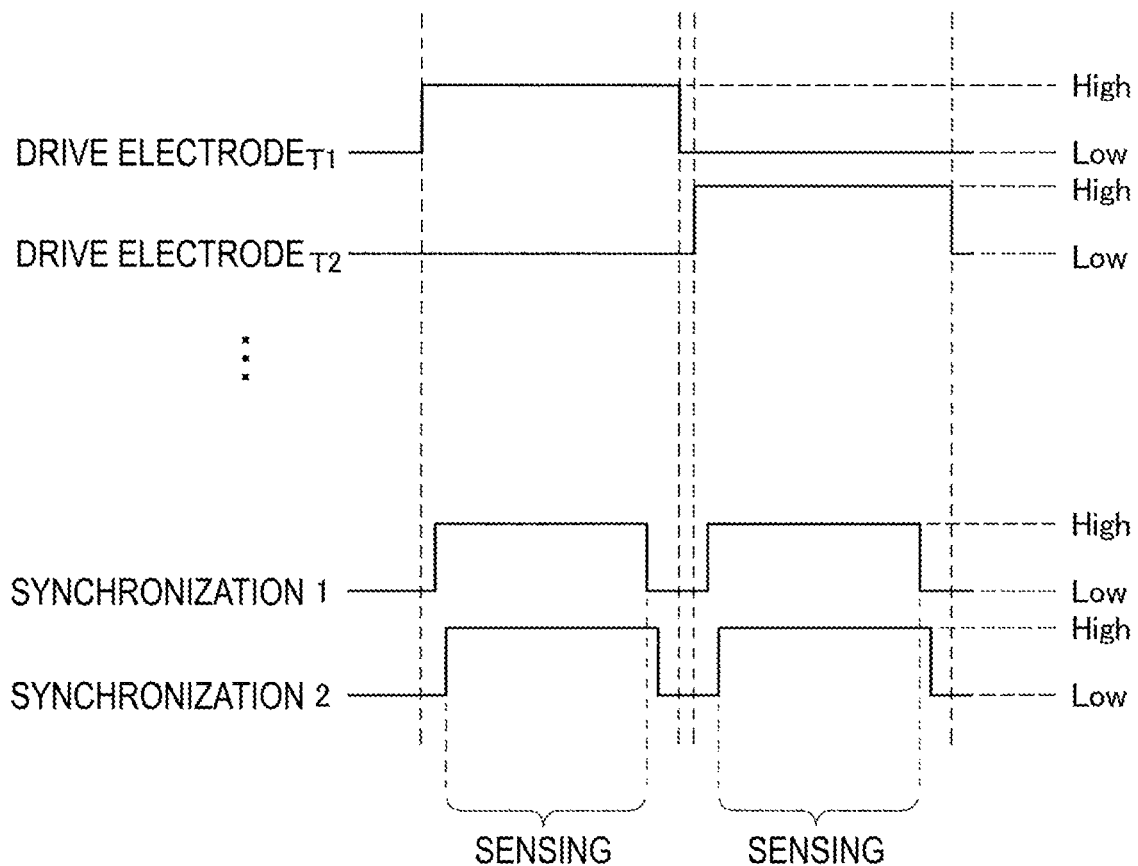
FIG. 6 illustrates a time chart for a touch panel pressing point detection control.

The touch panel pressing point detection control will be described with reference to FIG. 5 and FIG. 6. FIG. 5 is a flowchart for illustrating a touch panel pressing point detection control. FIG. 6 is a time chart for illustrating a touch panel pressing point detection control.

The control flowchart described below is an example, and each step can be omitted and replaced as necessary. In addition, a plurality of steps may be executed at the same time, or some or all of them may be executed in an overlapping manner.

Further, each block of the control flowchart is not limited to a single control operation, and can be replaced with a plurality of control operations represented by a plurality of blocks.

The control illustrated in FIG. 5 is the flow of processing of the upper software layer of the first touch controller 5 and the second touch controller 7. Accordingly, this is different from the processing of the lower software layer.

First, the control operation of the first touch controller 5 will be described.

In Step S1, a drive signal is transmitted from the first drive circuit 33 to the drive electrode Tx of the drive electrodes 17A (see the change from "Low" to "High" in the "drive electrode $T_1$" in FIG. 6). In particular, the first sensor controller 31 controls the first drive circuit 33 to execute the above operation. However, as illustrated in FIG. 1, the drive signals are actually transmitted from the first touch controller 5 to the drive electrodes $T_1$ to $T_{14}$. According to the embodiment, in a case of the drive electrodes $T_{15}$ to $T_{28}$, the drive signal transmission process is performed in the upper software layer of the first sensor controller 31, but the drive signal transmission process is not performed in the lower software layer.

In Step S2, the synchronization signals are changed from Low to High. In particular, the first sensor controller 31 sets the synchronization signals for the second touch controller 5 to High via the interface 39 (see the change from "Low" to "High" in "Synchronization 1" in FIG. 6).

In Step S3, the first sensor controller 31 waits until all the synchronization signals become High. In particular, the first sensor controller 31 waits until the synchronization signals from the second touch controller 7 become High (see the change from "Low" to "High" in "Synchronization 2" in FIG. 6).

In Step S4, sensing is performed. In particular, the first detection circuit 35 receives the detection signals from the detection electrodes 21A, the ADC 37 converts the detection signals into digital signals, and the first sensor controller 31 receives the signals resulting from the conversion. The first sensor controller 31 stores the detection signals in the storage unit. As illustrated in FIG. 1, however, the first touch controller 5 actually receives the detection signals of the detection electrodes $R_1$ to $R_9$.

After sensing is completed, the process proceeds to Step S5.

In Step S5, the synchronization signals are changed from High to Low (see the change from "High" to "Low" in "Synchronization 1" in FIG. 6). In particular, the first sensor controller 31 changes the synchronization signals for the second touch controller 7 to Low via the interface 39.

In Step S6, the first sensor controller 31 waits until all the synchronization signals become Low. In particular, the first sensor controller 31 waits until the synchronization signals from the second touch controller 7 become Low (see the change from "High" to "Low" in "Synchronization 2" in FIG. 6).

In Step S7, the subscript X of the drive electrodes is incremented.

In Step S8, it is determined whether the subscript X is larger than the number of drive electrodes. If the result is Yes, then the process ends. If the result is No, then the process returns to Step S1.

As described above, the above operation is repeated in the order of $T_1$, $T_2$, and $T_3$ of the drive electrodes 17A. As described above, however, the first touch controller 5 actually transmits the drive signal only to the drive electrodes $T_1$ to $T_{14}$.

Next, the control operation of the second touch controller 7 will be described.

In Step S1, a drive signal is transmitted from the second drive circuit 43 to the drive electrode Tx of the drive electrodes 17A. In particular, the second sensor controller 41 controls the second drive circuit 43 to execute the above operation. As illustrated in FIG. 1, however, the drive signals are actually transmitted from the second touch controller 7 to the drive electrodes $T_{15}$ to $T_{28}$. In a case of the drive electrodes $T_1$ to $T_{14}$, the drive signal transmission process is performed in the upper software layer of the second sensor controller 41, but the drive signal transmission process is not performed in the lower software layer.

In Step S2, the synchronization signals are changed from Low to High. In particular, the second sensor controller 41 sets the synchronization signals for the first touch controller 5 to High via the interface 49.

In Step S3, the second sensor controller 41 waits until all the synchronization signals become High. In particular, the second sensor controller 41 waits until the synchronization signals from the first touch controller 5 become High.

In Step S4, sensing is performed. In particular, the second detection circuit 45 receives the detection signals from the detection electrodes 21A, the ADC 47 converts the detection signals into digital signals, and the second sensor controller 41 receives the signals resulting from the conversion. The second sensor controller 41 stores the detection signals in the storage unit. As illustrated in FIG. 1, however, the second touch controller 7 actually receives the detection signals of the detection electrodes $R_{10}$ to $R_{18}$.

As described above, the first touch controller 5 and the second touch controller 7 synchronize with each other such that the operation for detecting the detection electrode group $R_1$ to $R_9$ by the first detection circuit 35 and the operation for detecting the detection electrode group $R_{10}$ to $R_{18}$ by the second detection circuit 45 are performed simultaneously. Accordingly, since the operation for detecting the detection electrodes $R_1$ to $R_9$ by the first detection circuit 35 and the operation for detecting the detection electrodes $R_{10}$ to $R_{18}$ by the second detection circuit 45 are simultaneously performed, the detection time can be shortened as a result.

In Step S5, the synchronization signal is changed from Low to High. In particular, the second sensor controller 41 changes the synchronization signal for the first touch controller 5 to Low via the interface 49.

In Step S6, the second sensor controller 41 waits until all the synchronization signals become Low. In particular, the second sensor controller 41 waits until all the synchronization signals from the first touch controller 5 become Low.

In Step S7, the subscript X of the drive electrodes is incremented.

In Step S8, it is determined whether the subscript X is larger than the number of drive electrodes. If the result is Yes, then the process ends. If the result is No, then the process returns to Step S1.

As described above, the above operation is repeated in the order of $T_1$, $T_2$, and $T_3$ of the drive electrodes 17A. As described above, however, the second touch controller 7 actually transmits the drive signal only to the drive electrodes $T_{15}$ to $T_{28}$.

As described above, in a first drive mode in which the first drive circuit 33 sequentially drives the first group ($T_1$ to $T_{14}$) of the drive electrodes 17A, the first detection circuit 35 detects the first group ($R_1$ to $R_9$) of the plurality of detection electrodes 21A, and the second detection circuit 45 detects the second group ($R_{10}$ to $R_{18}$) of the plurality of detection electrodes 21A.

In addition, in a second drive mode in which the second drive circuit 43 sequentially drives the second group ($T_{15}$ to $T_{28}$) of the drive electrodes 17A, the first detection circuit 35 detects the first group ($R_1$ to $R_9$) of the plurality of detection electrodes 21A, and the second detection circuit 45 detects the second group ($R_{10}$ to $R_{18}$) of the plurality of detection electrodes.

In the touch panel device 1, the first detection circuit 35 detects the pressing point in a case that the first group ($T_1$ to $T_{14}$) of the drive electrodes 17A is driven by the first drive circuit 33 or in a case that the second group ($T_{15}$ to $T_{28}$) of the drive electrodes 17A is driven by the second drive circuit 43. The second detection circuit 45 detects the pressing point in a case that the first group ($T_1$ to $T_{14}$) of the drive electrodes 17A is driven by the first drive circuit 33 or in a case that the second group ($T_{15}$ to $T_{28}$) of the drive electrodes 17A is driven by the second drive circuit 43.

As a result of the above, the first sensor controller 31 stores the detection results of the first sensor region A and the third sensor region C in the storage unit. Further, the second sensor controller 41 stores the detection results of the second sensor region B and the fourth sensor region D in the storage unit.

The second sensor controller 41 transmits the detection results to the first sensor controller 31.

The first sensor controller 31 performs the coordinate determination of the pressed location based on the detection result of the first sensor controller 31 and the detection result of the second sensor controller 41. Subsequently, the first sensor controller 31 transmits the coordinate information of the pressed location to the host controller 9.

2. Second Embodiment

Although the four sensor regions are detected by two touch controllers in the first embodiment, the number of control areas and the number of touch controllers are not particularly limited.

Figure 7:
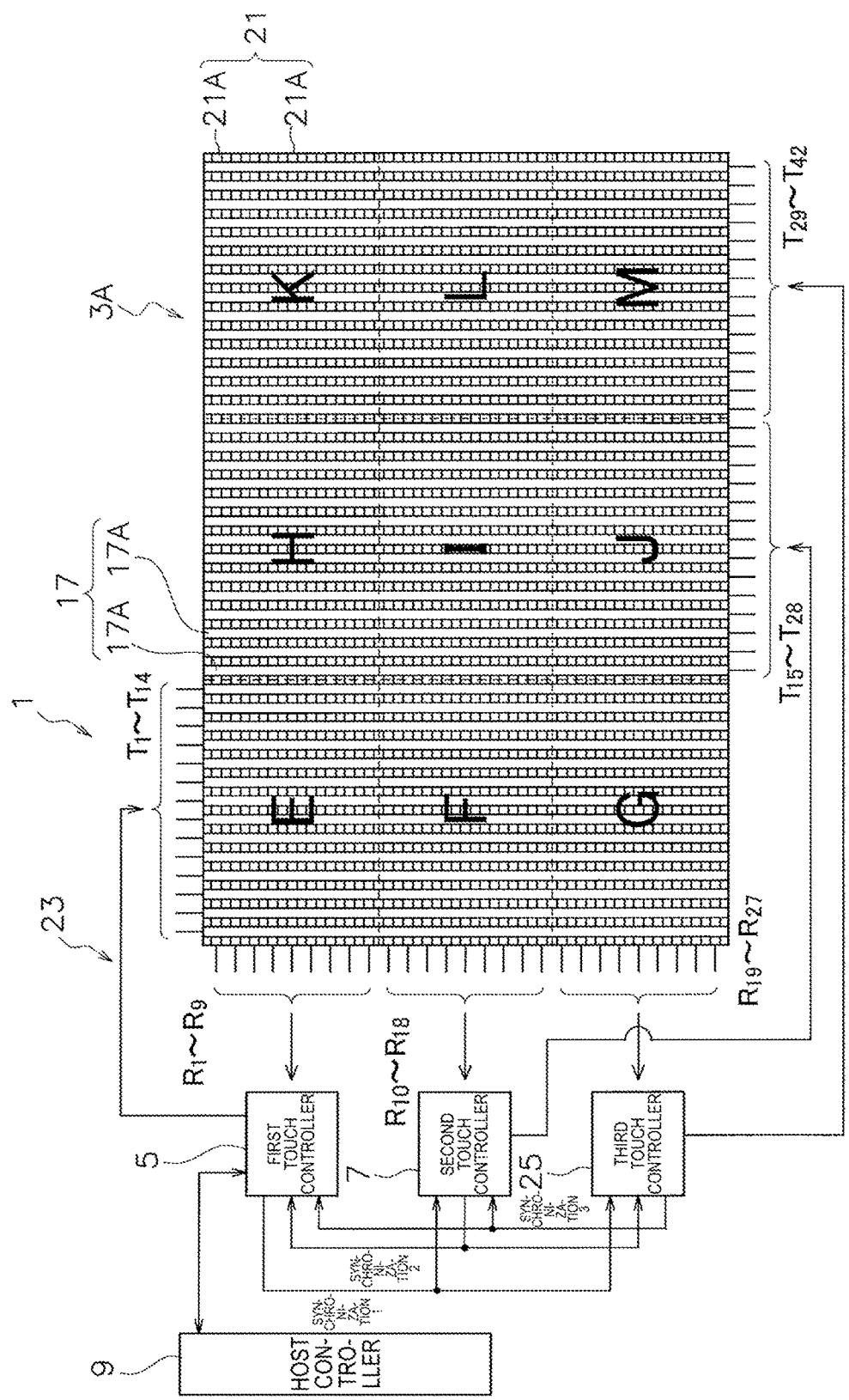
FIG. 7 is a schematic configuration diagram of a resistive film touch panel device according to a second embodiment.

A second embodiment will be described with reference to FIG. 7. FIG. 7 is a schematic configuration diagram of a resistive film touch panel device according to a second embodiment.

Hereinafter, the differences from the first embodiment will be primarily described.

The touch panel 3A is divided into 1134 matrix regions in which an upper electrode group 17 including 42 electrodes and a lower electrode group 21 including 27 electrodes overlap.

The touch panel device 1 includes a first touch controller 5. The touch panel device 1 includes a second touch controller 7. The touch panel device 1 includes a third touch controller 25.

As will be described later, the first touch controller 5, the second touch controller 7, and the third touch controller 25 have functions for detecting a pressed location by applying a voltage to the electrodes and detecting a change.

The touch panel device 1 includes a host controller 9. The host controller 9 controls the entire system, and includes a function for executing processing based on the touch coordinate locations obtained by the first touch controller 5, the second touch controller 7, and the third touch controller 25.

The drive circuit of the first touch controller 5 transmits the drive signal to only a portion (in particular, a third) of the drive electrodes 17A. The drive signal is transmitted to the drive electrodes ($T_1$ to $T_{14}$).

The detection circuit of the first touch controller 5 receives the detection signals from only a portion (in particular, a third) of the detection electrodes 21A. The detection signals are received from the detection electrodes ($R_1$ to $R_9$).

The drive circuit of the second touch controller 7 transmits a drive signal to only a portion (in particular, a third) of the drive electrodes 17A. The drive signals are transmitted to the drive electrodes ($T_{15}$ to $T_{28}$).

The detection circuit of the second touch controller 7 receives the detection signals from only a portion (in particular, a third) of the detection electrodes 21A. The detection signals are received from the detection electrodes ($R_{10}$ to $R_{18}$).

The drive circuit of the third touch controller 25 transmits a drive signal to only a portion (in particular, a third) of the drive electrodes 17A. The drive signals are transmitted to the drive electrodes $T_{29}$ to $T_{42}$ among the drive electrodes 17A.

The detection circuit of the third touch controller 25 receives the detection signals from only a portion (in particular, a third) of the detection electrodes 21A. The detection signals are received from the detection electrodes ($R_{19}$ to $R_{27}$) of the detection electrodes 21A.

The first touch controller 5, the second touch controller 7, and the third touch controller 25 transmit and receive synchronization signals to and from each other.

The operations of the first touch controller 5, the second touch controller 7, and the third touch controller 25 for each sensor region will be described.

In FIG. 7, the touch panel 3A is divided into nine sensor regions, as indicated by the dashed lines. In FIG. 7, for the first sensor region E (the first column from the left and the first row from the top) of the touch panel 3A, the first touch controller 5 performs the drive and detection. For the second sensor region F (the first column from the left and the second row from the top), the first touch controller 5 performs the drive, and the second touch controller 7 performs the detection. For the third sensor region G (the first column from the left and the third row from the top), the first touch controller 5 performs the drive, and the third touch controller 25 performs the detection.

For the fourth sensor region H (the second column from the left and the first row from the top) of the touch panel 3A, the second touch controller 7 performs the drive, and the first touch controller 5 performs the detection. For the fifth sensor region I (the second column from the left and the second row from the top), the second touch controller 7 performs the drive and detection. For the sixth sensor region J (the second column from the left and the third row from the top), the second touch controller 7 performs the drive, and the third touch controller 25 performs the detection.

For the seventh sensor region K (the third column from the left and the first row from the top) of the touch panel 3A, the third touch controller 25 performs the drive, and the first touch controller 5 performs the detection. For the eight sensor region L (the third column from the left and the second row from the top), the third touch controller 25 performs the drive, and the second touch controller 7 performs the detection. For the ninth sensor region M (the third column from the left and the third row from the top), the third touch controller 25 performs the drive and detection.

In the touch panel device 1, the number of sensor regions covered by a touch controller can be increased; that is, the number of touch controllers can be reduced. In particular, the first touch controller 5, the second touch controller 7, and the third touch controller 25 can cover an area corresponding to nine sensor regions, which would require nine touch controllers in the related art.

A sensor region is divided into nine in the related art, while a single sensor region is used in the present embodiment. This prevents the end portions of the electrodes from existing inside the sensor regions in the present embodiment (that is, there is no boundary portion between the electrodes). As a result, the sensitivity uniformity in the plane of the touch panel 3A is improved.

3. Third Embodiment

In the first embodiment and the second embodiment, the number of sensor regions that can be covered is equal to the square of the number of touch controllers. However, the number of sensor regions that can be covered may be less than the square of the number of touch controllers. In particular, instead of touch controllers that perform both the drive and detection, touch controllers that perform only the drive or that perform only the detection may be provided, thus causing the number of sensor regions to be less than the square of the number of touch controllers.

Figure 8:
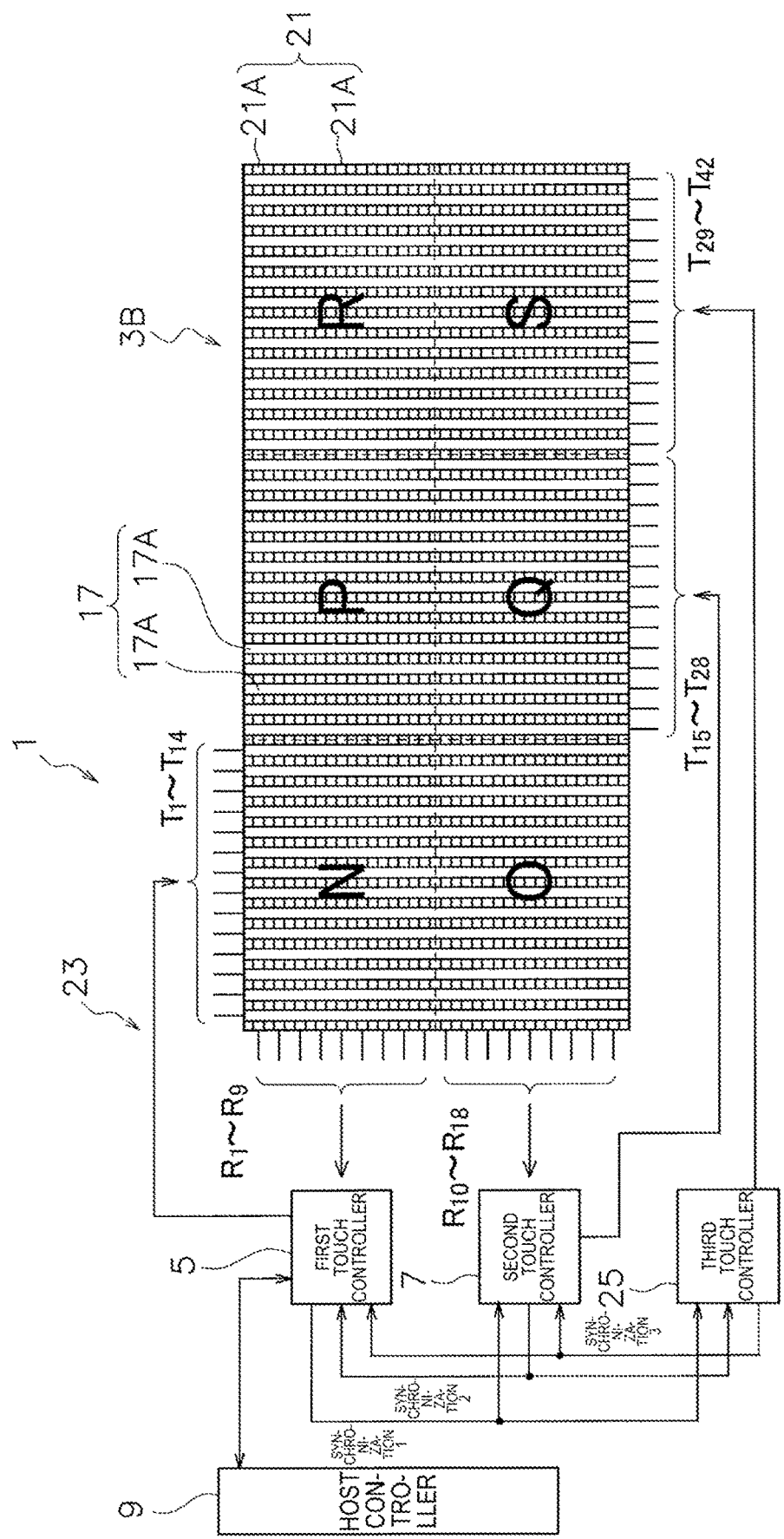
FIG. 8 is a schematic configuration diagram of a resistive film touch panel device according to a third embodiment.

Such an embodiment will be described with reference to FIG. 8. FIG. 8 is a schematic configuration diagram of a resistive film touch panel device according to the third embodiment.

Hereinafter, the differences from the second embodiment will be primarily described.

The touch panel 3B is divided into 756 matrix regions in which an upper electrode group 17 including 42 electrodes and a lower electrode group 21 including 18 electrodes overlap.

The touch panel device 1 includes a first touch controller 5. The touch panel device 1 includes a second touch controller 7. The touch panel device 1 includes a third touch controller 25.

As will be described later, the first touch controller 5, the second touch controller 7, and the third touch controller 25 have functions for detecting a pressed location by applying a voltage to the electrodes and detecting a change.

The touch panel device 1 includes a host controller 9. The host controller 9 controls the entire system, and includes a function for executing processing based on the touch coordinate location obtained by the first touch controller 5 and the second touch controller 7.

The drive circuit of the first touch controller 5 transmits the drive signal to only a portion (in particular, a third) of the drive electrodes 17A. The drive signal is transmitted to the drive electrodes ($T_1$ to $T_{14}$) of the drive electrodes 17A.

The detection circuit of the first touch controller 5 receives the detection signals from only a portion (in particular, half) of the detection electrodes 21A. The detection signals are received from the detection electrodes ($R_1$ to $R_9$).

The drive circuit of the second touch controller transmits a drive signal to only a portion (in particular, a third) of the drive electrodes 17A. The drive signals are transmitted to the drive electrodes ($T_{15}$ to $T_{28}$).

The detection circuit of the second touch controller 7 receives the detection signals from only a portion (in particular, half) of the detection electrodes 21A. The detection signals are received from the detection electrodes ($R_{10}$ to $R_{18}$).

The drive circuit of the third touch controller 25 transmits a drive signal to only a portion (in particular, a third) of the drive electrodes 17A. The drive signals are transmitted to the drive electrodes $T_{29}$ to $T_{42}$.

The third touch controller 25 does not receive the detection signals.

The first touch controller 5, the second touch controller 7, and the third touch controller 25 transmit and receive synchronization signals to and from each other as illustrated in FIG. 8.

The operations of the first touch controller 5, the second touch controller 7, and the third touch controller 25 for each sensor region will be described.

In FIG. 8, the touch panel 3B is divided into six sensor regions as indicated by the dashed lines. In FIG. 8, for the first sensor region N (the first column from the left and the first row from the top) of the touch panel 3B, the first touch controller 5 performs the drive and detection. For the second sensor region O (the first column from the left and the second row from the top), the first touch controller 5 performs the drive, and the second touch controller 7 performs the detection.

For the third sensor region P (the second column from the left and the first row from the top) of the touch panel 3B, the second touch controller 7 performs the drive, and the first touch controller 5 performs the detection. For the fourth sensor region Q (the second column from the left and the second row from the top), the second touch controller 7 performs the drive and detection.

For the fifth sensor region R (the third column from the left and the first row) of the touch panel 3B, the third touch controller 25 performs the drive, and the first touch controller 5 performs the detection. For the sixth sensor region S (the third column from the left and the second row from the top), the third touch controller 25 performs the drive, and the second touch controller 7 performs the detection.

In the touch panel device 1, the number of sensor regions covered by a touch controller can be increased; that is, the number of touch controllers can be reduced. In particular, the first touch controller 5, the second touch controller 7, and the third touch controller 25 can cover an area corresponding to six sensor regions, which would require six touch controllers in the related art.

A sensor region is divided into six in the related art, while a single sensor region is used in the present embodiment. This prevents the end portions of the electrodes from existing inside the sensor regions in the present embodiment (that is, there is no boundary portion between the electrodes). As a result, the sensitivity uniformity in the plane of the touch panel 3B is improved.

4. Another Embodiment

Although embodiments of the present invention have been described above, the present invention is not limited to the above embodiments, and various modifications are possible without departing from the gist of the invention. In particular, the embodiments and modifications described in this specification can be optionally combined as necessary.

The configuration, layout, and materials of the resistive film touch panel are not limited to the above embodiments. For example, the upper electrode group may be the detection electrodes and the lower electrode group may be the drive electrodes. In addition, the drive electrodes and the detection electrodes may have different structures and materials.

The internal configuration of the touch controllers is not limited to the above embodiments.

The process of pressing point detection control is not limited to the above embodiments.

INDUSTRIAL APPLICABILITY

The present invention can be widely applied to methods for acquiring data from resistive film touch panels and resistive film touch panel devices.

REFERENCE SIGNS LIST

1 Resistive film touch panel device
3 Resistive film touch panel
5 First touch controller
7 Second touch controller
9 Host controller
11 Upper electrode member
13 Lower electrode member
15 Insulating film
17 Upper electrode group
17A Drive electrode
19 Insulating film
21 Lower electrode group
21A Detection electrode
23 Wiring
25 Third touch controller
27 Conductive layer
29 Pressure-sensitive ink layer
31 First sensor controller
33 First drive circuit
35 First detection circuit
37 ADC
39 Interface
41 Second sensor controller
43 Second drive circuit
45 Second detection circuit
47 ADC
49 Interface

The invention claimed is:

1. A resistive film touch panel device comprising:
a resistive film touch panel including a plurality of drive electrodes that extend in a first direction and a plurality of detection electrodes that extend in a second direction intersecting the first direction and that face, with a spacing, the plurality of drive electrodes;
first touch controller circuitry that includes a first drive circuit configured to electrically connect to a first drive electrode group of the plurality of drive electrodes and a first detection circuit configured to electrically connect to, among the plurality of detection electrodes, a first detection electrode group that intersects the first drive electrode group; and
second touch controller circuitry that includes a second drive circuit configured to electrically connect to, among the plurality of drive electrodes, a second drive electrode group that intersects the first detection electrode group and a second detection circuit configured to electrically connect to, among the plurality of detection electrodes, a second detection electrode group that intersects the first drive electrode group and the second drive electrode group, wherein
the first touch controller circuitry and the second touch controller circuitry are configured to receive, from the first detection electrode group and the second detection electrode group respectively, detection signals from a same side of the resistive film touch panel,
in the first drive mode, the first touch controller and the second touch controller synchronize with each other such that an operation for detecting the first detection electrode group by the first detection circuit and an operation for detecting the second detection electrode group by the second detection circuit are performed simultaneously, and
in the second drive mode, the first touch controller and the second touch controller synchronize with each other such that an operation for detecting the first detection electrode group by the first detection circuit and an operation for detecting the second detection electrode group by the second detection circuit are performed simultaneously.

2. The resistive film touch panel device according to claim 1, wherein:
in a first drive mode in which the first drive circuit sequentially drives the first drive electrode group, the first detection circuit is configured to detect the first detection electrode group and the second detection circuit is configured to detect the second detection electrode group; and
in a second drive mode in which the second drive circuit sequentially drives the second drive electrode group, the first detection circuit is configured to detect the first detection electrode group, and the second detection circuit is configured to detect the second detection electrode group.

3. The resistive film touch panel device according to claim 1, wherein
the first touch controller circuitry and the second touch controller circuitry are provided on the same side of the resistive film touch panel.

4. The resistive film touch panel device according to claim 1, wherein
the resistive film touch panel has a rectangular shape having a first side, a second side, a third side, and a fourth side in this order clockwise,
the first touch controller circuitry is configured to transmit drive signals to the first drive electrode group from the first side of the resistive film touch panel, the second touch controller circuitry is configured to transmit drive signals to the second drive electrode group from the third side of the resistive film touch panel, the first touch controller circuitry is configured to receive the detection signals from the first detection electrode group from the fourth side of the resistive film touch panel, and the second touch controller circuitry is configured to receive the detection signals from the second detection electrode group from the fourth side of the resistive film touch panel.

5. A method for acquiring data from a resistive film touch panel including a plurality of drive electrodes that extend in a first direction and a plurality of detection electrodes that extend in a second direction intersecting the first direction and that face the plurality of drive electrodes, the method comprising:

in a first drive mode in which a first drive circuit of first touch controller circuitry sequentially drives a first drive electrode group of the plurality of drive electrodes, detecting, using a first detection circuit of the first touch controller circuitry, among the plurality of detection electrodes, a first detection electrode group that intersects the first drive electrode group, and detecting, using a second detection circuit of second touch controller circuitry, among the plurality of detection electrodes, a second detection electrode group that intersects the first drive electrode group; and in a second drive mode in which a second drive circuit of the second touch controller circuitry sequentially drives, among the plurality of drive electrodes, a second drive electrode group that intersects the first detection electrode group and the second detection electrode group, detecting, using the first detection circuit of the first touch controller circuitry, the first detection electrode group, and detecting, using the second detection circuit of the second touch controller circuitry, the second detection electrode group, wherein the first touch controller circuitry and the second touch controller circuitry are configured to receive, from the first detection electrode group and the second detection electrode group respectively, detection signals from a same side of the resistive film touch panel, in the first drive mode, the first touch controller circuitry and the second touch controller circuitry synchronize with each other such that an operation for detecting the first detection electrode group by the first detection circuit and an operation for detecting the second detection electrode group by the second detection circuit are performed simultaneously, and in the second drive mode, the first touch controller circuitry and the second touch controller circuitry synchronize with each other such that an operation for detecting the first detection electrode group by the first detection circuit and an operation for detecting the second detection electrode group by the second detection circuit are performed simultaneously.

6. The method according to claim 5, wherein the first touch controller circuitry and the second touch controller circuitry are provided on the same side of the resistive film touch panel.

7. The method according to claim 5, wherein the resistive film touch panel has a rectangular shape having a first side, a second side, a third side, and a fourth side in this order clockwise, the first touch controller circuitry is configured to transmit drive signals to the first drive electrode group from the first side of the resistive film touch panel, the second touch controller circuitry is configured to transmit drive signals to the second drive electrode group from the third side of the resistive film touch panel, the first touch controller circuitry is configured to receive the detection signals from the first detection electrode group from the fourth side of the resistive film touch panel, and the second touch controller circuitry is configured to receive the detection signals from the second detection electrode group from the fourth side of the resistive film touch panel.

8. The method according to claim 5, further comprising, in the first drive mode:

setting, using the first touch controller circuitry, first synchronization signals transmitted to the second touch controller circuitry to high after driving the first drive electrode group of the plurality of drive electrodes;

determining, using the first touch controller circuitry, whether both the first synchronization signals and second synchronization signals transmitted from the second touch controller circuitry are high;

detecting, using the first detection circuit of the first touch controller circuitry, among the plurality of detection electrodes, the first detection electrode group in response to determining that both the first synchronization signals and second synchronization signals transmitted from the second touch controller circuitry are high; and detecting, using the second detection circuit of second touch controller circuitry, among the plurality of detection electrodes, the second detection electrode group in response to determining that both the first synchronization signals and second synchronization signals transmitted from the second touch controller circuitry are high.

* * * * *